(12) United States Patent
Wandebäck

(10) Patent No.: US 8,277,151 B2
(45) Date of Patent: Oct. 2, 2012

(54) ROTATABLE TOOL FOR CHIP REMOVING MACHINING AS WELL AS A CUTTING INSERT THEREFOR

(75) Inventor: Gustaf Wandebäck, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 417 days.

(21) Appl. No.: 12/708,101

(22) Filed: Feb. 18, 2010

(65) Prior Publication Data
US 2010/0215446 A1     Aug. 26, 2010

(30) Foreign Application Priority Data
Feb. 20, 2009 (SE) ........................ 0950097

(51) Int. Cl.
*B23C 5/20* (2006.01)
(52) U.S. Cl. .............. 407/42; 407/113; 407/34
(58) Field of Classification Search ............... 407/35, 407/42, 113, 33, 40, 12, 19, 29, 43, 120; *B23C 5/20*
See application file for complete search history.

(56) References Cited

U.S. PATENT DOCUMENTS

| | | | | | |
|---|---|---|---|---|---|
| 3,207,011 | A | * | 9/1965 | Erfert | 82/104 |
| 3,881,887 | A | * | 5/1975 | McMaster | 451/49 |
| 4,294,566 | A | * | 10/1981 | Boone | 407/114 |
| 4,474,721 | A | * | 10/1984 | Carpenter | 264/157 |
| 4,539,875 | A | * | 9/1985 | Lee et al. | 82/1.11 |
| 4,709,508 | A | * | 12/1987 | Junker | 451/49 |
| 5,246,315 | A | | 9/1993 | Hansson et al. | |
| 5,256,008 | A | * | 10/1993 | Hansson et al. | 407/33 |
| 5,653,152 | A | * | 8/1997 | Oles et al. | 82/1.11 |
| 2002/0119016 | A1 | * | 8/2002 | Woodward | 407/35 |
| 2009/0274524 | A1 | * | 11/2009 | Hidai et al. | 407/34 |
| 2010/0183386 | A1 | * | 7/2010 | Heinloth et al. | 407/113 |

FOREIGN PATENT DOCUMENTS

| | | | |
|---|---|---|---|
| EP | 0 870 563 | | 10/1998 |
| JP | 5-116018 | | 5/1993 |
| JP | 11333605 A | * | 12/1999 |
| SU | 965590 A | * | 10/1982 |

OTHER PUBLICATIONS

International Search Report mailed Apr. 14, 2010 issued in PCT Application No. PCT/SE2010/050195.

* cited by examiner

*Primary Examiner* — Boyer D Ashley
*Assistant Examiner* — Sara Addisu
(74) *Attorney, Agent, or Firm* — Morgan, Lewis & Bockius LLP

(57) ABSTRACT

A cutting or milling insert for rotatable tool for chip removing machining and of the type that comprises a cutting edge in a transition between a front chip surface and a clearance surface extending rearward from the same. Remotely behind the first-mentioned cutting edge, a second cutting edge is formed in a transition between, on one hand, a second chip surface behind the first clearance surface, and, on the other hand, a trailing second clearance surface. The spacing between opposite sections of the front cutting edge is greater than the corresponding spacing between opposite sections of the second or rear cutting edge, the cutting edge angle ($\alpha$) of at least the front cutting edge being acute. A rotatable cutting tool, which is equipped with the cutting or milling insert is also provided.

9 Claims, 5 Drawing Sheets

ROTATABLE TOOL FOR CHIP REMOVING MACHINING AS WELL AS A CUTTING INSERT THEREFOR

CROSS-REFERENCE TO PRIOR APPLICATION

This application claims priority to Sweden Application No. 0950097-6 filed Feb. 20, 2009, which is incorporated by reference herein.

FIELD OF THE INVENTION

In one aspect, this invention relates to a rotatable tool intended for chip removing machining comprising a basic body, which is rotatable in a predetermined direction around a center axis, as well as a replaceable and indexable cutting insert of a material that is harder and more wear-resistant than the material of the basic body, the cutting insert being mounted in a seating in the basic body and comprising an upperside and an underside between which a center axis extends, and a number of alternately useable first cutting edges which are located in an upper plane extending perpendicularly to the center axis and each one of which is formed in a transition between a front chip surface included in the upperside and a first clearance surface extending rearwardly therefrom, as well as second cutting edges located in an intermediate plane and each one formed in a transition between, on one hand, a second chip surface behind a first clearance surface and, on the other hand, a trailing second clearance surface.

In another aspect, the invention also relates to a replaceable and indexable cutting insert as such. Tools of the kind in question are suitable for chip removing or cutting machining of workpieces of metal, such as steel, cast iron, aluminium, titanium, yellow metals, etc. Also, the tools may be used for the machining of composite materials of different types.

BACKGROUND

Rotatable tools such as milling cutters are equipped with a few to a large number of milling inserts. For instance, shank-end mills often include only two milling inserts, while certain types of face mills may include hundreds of milling inserts or more. A general aim in the technology in question is to design the milling tools with the smallest possible tooth pitch with the purpose of providing the same with as large a number of active cutting edges as possible, all for the purpose of minimizing the cutting forces, in particular the tangential forces, acting on the milling inserts. However, the physical nature of the milling cutter limits how close to each other the milling inserts can be mounted along the periphery of the basic body, because the tool requires a chip space or chip pocket in the area in front of the milling insert as viewed in the direction of rotation, as well as a fairly thick material portion behind the same in order to support the milling insert and carry the tangential forces.

Furthermore, all active cutting edges of the different milling inserts are usually identical in respect of the design thereof along the cutting edge lines. If the milling cutter is intended for rough milling, when considerable cutting forces arise, the cutting edges are extra strong, e.g., by the fact that one or more reinforcement bevels are formed in the same. However, if the milling cutter is to be used for fine milling and the cutting forces are moderate or small, all cutting edges are sharper or keener. Usually, the cutting edges of fine milling inserts include only a rounding, which is brushed or provided in another way, between the chip surface and the clearance surface. In some milling cutters, rough milling inserts are combined with fine milling inserts, e.g., by the fact that every second milling insert is of the first type and the other one of the second type.

In order to increase the number of active cutting edges without making it necessary to increase the number of cutting inserts and seatings in milling bodies, JP 5116018 A discloses designing the individual cutting insert with two cutting edges located behind each other. A disadvantage of the problem solution presented in the above-mentioned document is, however, that the radial distance of the rearward second cutting edge from the center axis of the individual cutting insert is greater than the one of the first front cutting edge. This means that the cutting inserts—for simple geometric reasons—have to be mounted with negative tipping-in angles in the basic body of the milling cutter. The detrimental result of this necessity is that the cutting inserts become dull-cutting.

SUMMARY

The present invention aims at obviating the above-mentioned disadvantages of the cutting tool and milling insert being previously known by JP 5116018 A. Therefore, a primary object of the invention is to provide a rotatable cutting tool in which the milling inserts are easy-cutting, more precisely by making it possible to design at least the front cutting edge—and preferable also the rear one—with positive cutting geometries and to locate the milling insert in positive tipping-in angles in the basic body. Furthermore, the cutting forces acting on the milling inserts and thereby the wear there should be reduced in comparison with the milling inserts for previously known tools of the same type.

In another aspect, the invention also relates to a rotatable cutting tool, in particular a milling tool, which is equipped with cutting or milling inserts according to the invention.

In one aspect of the invention, there is provided an indexable cutting insert for rotatable tools for chip removing machining comprising an upperside and an underside between which a center axis extends, a plurality of alternately useable first cutting edges which are located in an upper plane extending perpendicularly to the center axis and each one of which is formed in a transition between a front chip surface included in the upperside and a first clearance surface extending rearwardly therefrom, and second cutting edges located in an intermediate plane and each said second cutting edges formed in a transition between a second chip surface behind a first clearance surface and a trailing second clearance surface, wherein a distance between diametrically opposed first cutting edges in the upper plane is greater than a distance between analogous second cutting edges in the intermediate plane, and that a cutting edge angle ($\alpha$) of at least each first cutting edge is acute.

In another aspect of the invention, there is provided a rotatable tool for chip removing machining comprising a basic body, which is rotatable in a predetermined direction around a center axis, a replaceable and indexable cutting insert of a material that is harder and more wear-resistant than a material of the basic body, the cutting insert being mounted in a seating in the basic body and comprising an upperside and an underside between which a center axis extends, and a plurality of alternately useable first cutting edges which are located in an upper plane extending perpendicularly to the center axis and each one of which is formed in a transition between a front chip surface included in the upperside and a first clearance surface extending rearwardly therefrom, and second cutting edges located in an intermediate plane and each one formed in a transition between a second chip surface behind a first clearance surface and a trailing second clearance surface, wherein a distance between diametrically opposed first cutting edges in the upper plane is greater than a distance between analogous second cutting edges in the intermediate plane, and that a cutting edge angle (α) of at least each first cutting edge is acute.

DETAILED DESCRIPTION OF THE PREFERRED EMBODIMENTS

In this description and the subsequent claims, the concept "cutting edge" is used as a general denomination of a cutting edge of the type that is formed in the transition between a chip surface and a clearance surface. If the milling insert has a polygonal, e.g., a rectangular basic shape, the cutting edge is composed of a chip-removing main edge, as well as a surface-wiping secondary edge or a so-called wiper edge, which runs at an angle to the main edge. If the milling insert has a round basic shape, the cutting edge is, however, endless and usually circular (at times also milling inserts having an extremely polygonal, e.g., 16-cornered, cutting edge of an essentially circular shape are considered to belong to the category "round milling inserts").

The concept "clearance surface" is used to denote an entire clearance surface connected to one or more cutting edges. If the milling insert is round, the clearance surface has an endless, rotationally symmetrical shape, e.g., conical, but if the same has a polygonal basic shape with a moderate number of corners, the clearance surface in its entirety includes a plurality of usually plane part surfaces. Furthermore, it should be pointed out that the concepts "front" and "rear", respectively, as used in connection with the insert relate to the direction of rotation of the tool.

Figure 1:
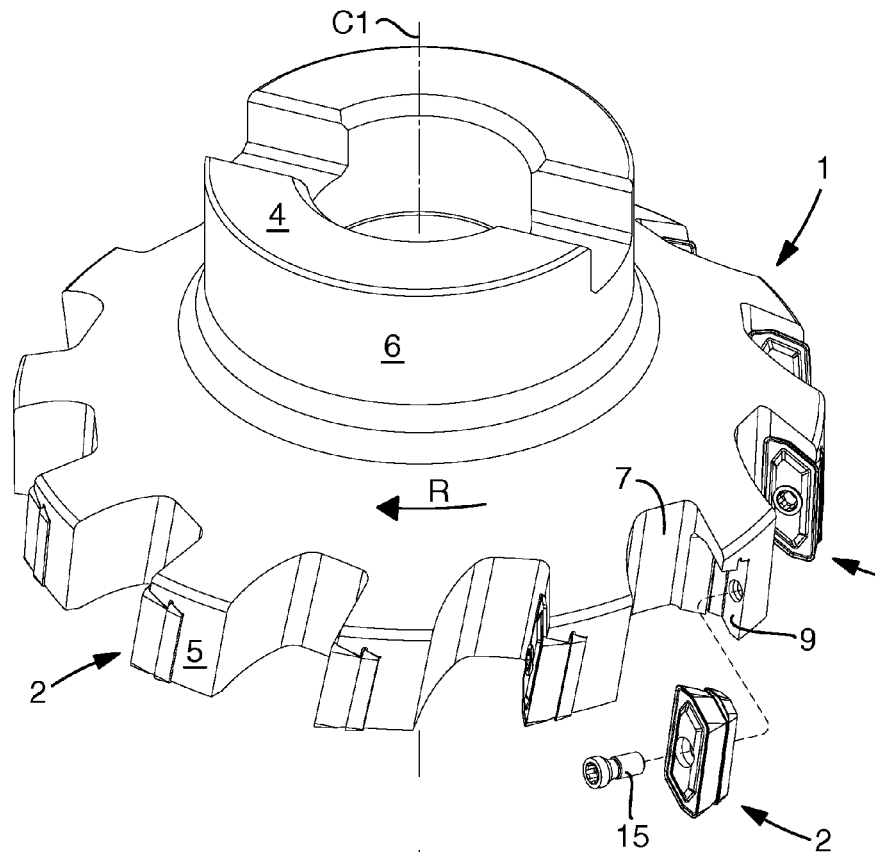
FIG. 1 is a perspective view showing a rotatable cutting tool in the form of a milling cutter, more precisely as viewed obliquely from above.
Figure 2:
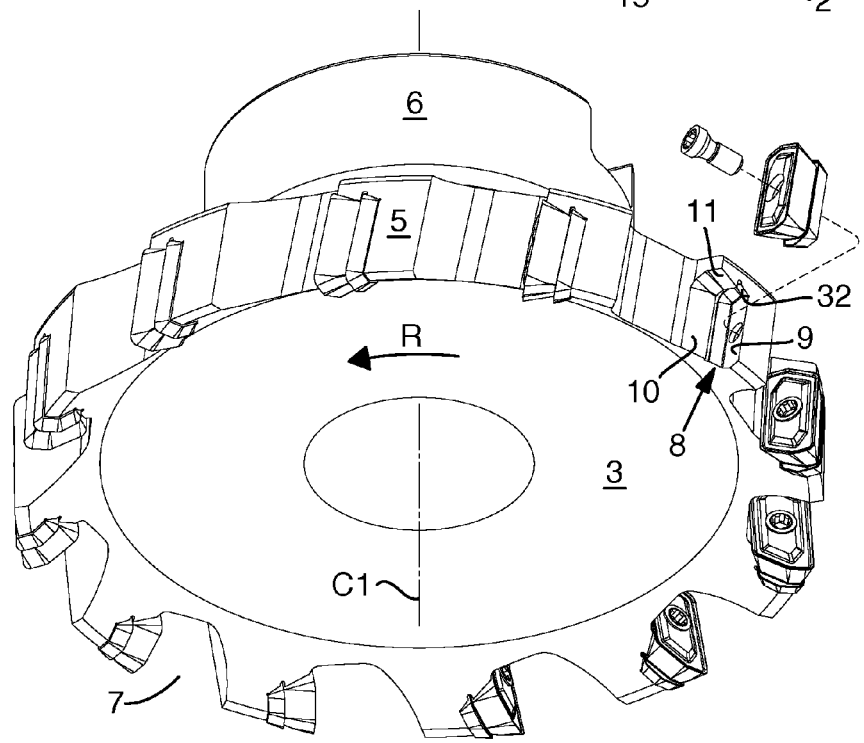
FIG. 2 is a perspective view of the same tool as viewed obliquely from below.
Figure 3:
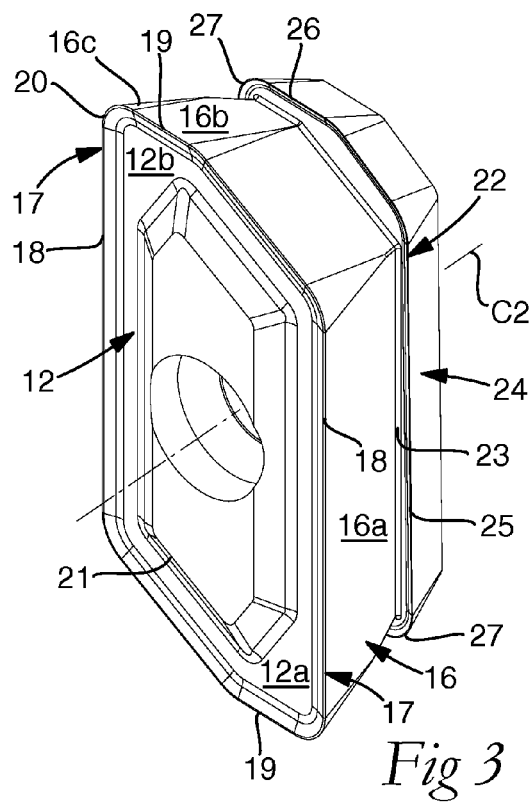
FIG. 3 is an enlarged perspective view showing a milling insert according to the invention included in the tool, more precisely as viewed obliquely from the front or toward the upperside thereof.
Figure 4:
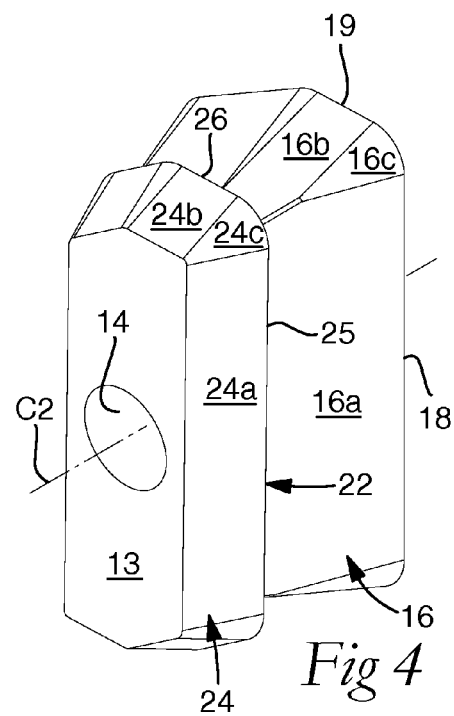
FIG. 4 is a perspective view showing the milling insert as viewed from behind or toward the underside thereof.

The tool shown in FIGS. 1 and 2 is an end or face mill, which includes a basic body 1 and a plurality of replaceable and indexable milling inserts 2. The basic body 1, which is rotatable in the direction of rotation R around a center axis C1, has a rotationally symmetrical basic shape and includes axially spaced-apart front and rear end surfaces 3, 4, as well as a first peripheral envelope surface 5, which is included in a front, disc-shaped part of the basic body. A second envelope surface 6 is included in a rear part that is attachable to a driving machine (not shown). In the envelope surface 5, pockets 7 are countersunk, which form chip pockets or chip spaces in front of the milling inserts 2 (as viewed in the direction of rotation). In each such pocket 7, a seating, in its entirety designated 8, is also included and that is delimited by a bottom surface 9 and two side support surfaces 10, 11, the first-mentioned one 10 of which forms a radial support and the last-mentioned one 11 an axial support for the milling insert 2. The greatest cutting forces that act on the milling insert, viz., the tangential forces, are carried by the bottom surface 9.

In a traditional way, the basic body 1 may be manufactured from steel, aluminum or another comparatively ductile material, while the milling inserts 2 are manufactured from a harder and more wear-resistant material, such as covered or uncovered cemented carbide, cermet, ceramics or the like.

The different milling inserts 2 are advantageously placed with a uniform pitch by the fact that the seatings 8 are equidistantly spaced-apart along the envelope surface 5. In the example according to FIGS. 1 and 2, the tool includes twelve milling inserts 2 having an even pitch of 30° (the pitch could also be non-uniform).

Reference is now made to FIGS. 3-7, which in detail illustrate the nature of the milling insert 2 according to the invention. This milling insert has a polygonal basic shape and includes an upperside, in its entirety designated 12, and an underside 13, between which a through hole 14 extends for a tightening screw 15 (see FIG. 1). The upperside 12 serves as a front chip surface, more precisely by including two part surfaces 12a, 12b against which chips are formed during the machining. In the backward direction from the chip surface 12, a first clearance surface, in its entirety designated 16, extends, which in this case, when the milling insert has a polygonal basic shape, includes a plurality of part surfaces, among which the part surfaces designated 16a, 16b, 16c are of interest. Between the chip surface 12 and the clearance surface 16, cutting edges are formed in a traditional way, viz., two alternately useable cutting edges 17, which individually include a chip-removing main edge 18, as well as a surface-wiping secondary or wiper edge 19. The clearance part surface 16c has a convex shape and forms a transition between the plane clearance part surfaces 16a, 16b. In the transition between the chip surface 12 and the part surface 16c, a convex corner edge 20 is formed between the main edge 18 and the secondary edge 19. It should be pointed out that the cutting edges 17 are included in a circumferential and continuous cutting edge formation and that the upperside 12 is situated in an upper plane UP, which is defined by the cutting edge formation (see FIG. 7). In this case, the plane UP is parallel to the lower plane LP, in which the underside 13 is situated.

In the upperside of the milling insert, a lug or shoulder 21 is formed, the limiting surfaces of which forms a chip breaker. Here, the underside 13 of the milling insert is a plane surface, which in this case is parallel to the upperside 12. For the sake of completeness, it should be understood that the clearance part surface 16a, along the cutting edge that is inactive, is pressed against the radial support surface 10 of the seating 8, at the same time as the clearance part surface 16b is kept pressed against the axial support surface 11.

A second cutting edge 22 is formed remotely behind each front, first cutting edge 17, more precisely in a transition between a second chip surface 23 and a second clearance surface 24 extending rearward from the same. Like each front cutting edge 17, the individual, second cutting edge 22 includes a main edge 25 and a secondary edge or wiper edge 26. The part edges transform into each other via a convex corner edge 27 (see FIG. 3). While the front clearance surface 16 forms a primary clearance surface, the rear clearance surface 24 forms a secondary clearance surface in which—for each cutting edge—three secondary clearance part surfaces are included, viz., the surfaces 24a, 24b and 24c. The chip surfaces and clearance surfaces between which each rear cutting edge 22 is delimited, are included in a step or rear part 28 (see FIG. 6), while the primary clearance part surfaces adjacent to the front cutting edge 17 are included in a front part 29 of the same.

In the example shown, the milling insert has a generally positive cutting geometry by the fact that each front cutting edge 17 (see FIG. 7) has a cutting edge angle α (the angle between the chip surface and the clearance surface) that is acute. Suitably, the cutting edge angle α is within the range of from about 45 to about 75°. In an analogous way, also the cutting edge angle β of the second, rear cutting edge 23 is acute. In practice, β may also be within the range of from about 45 to about 75°.

Figure 5:
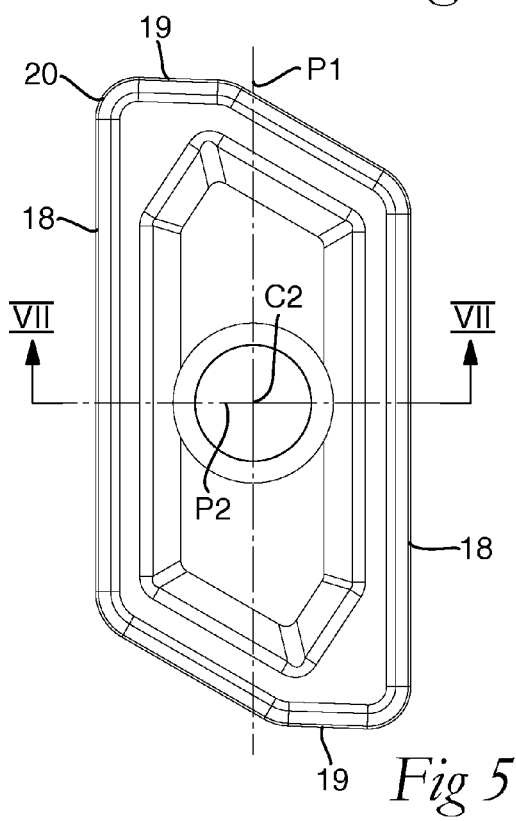
FIG. 5 is a planar view from above of the milling insert.
Figure 6:
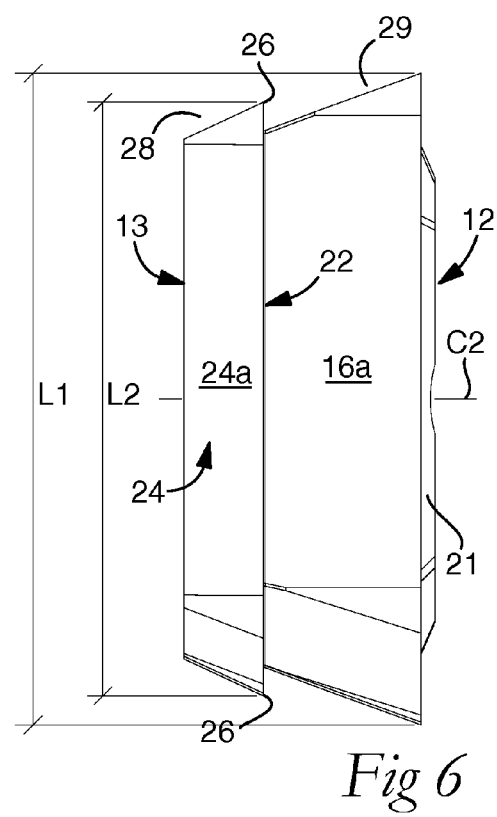
FIG. 6 is a side view of the milling insert.
Figure 7:
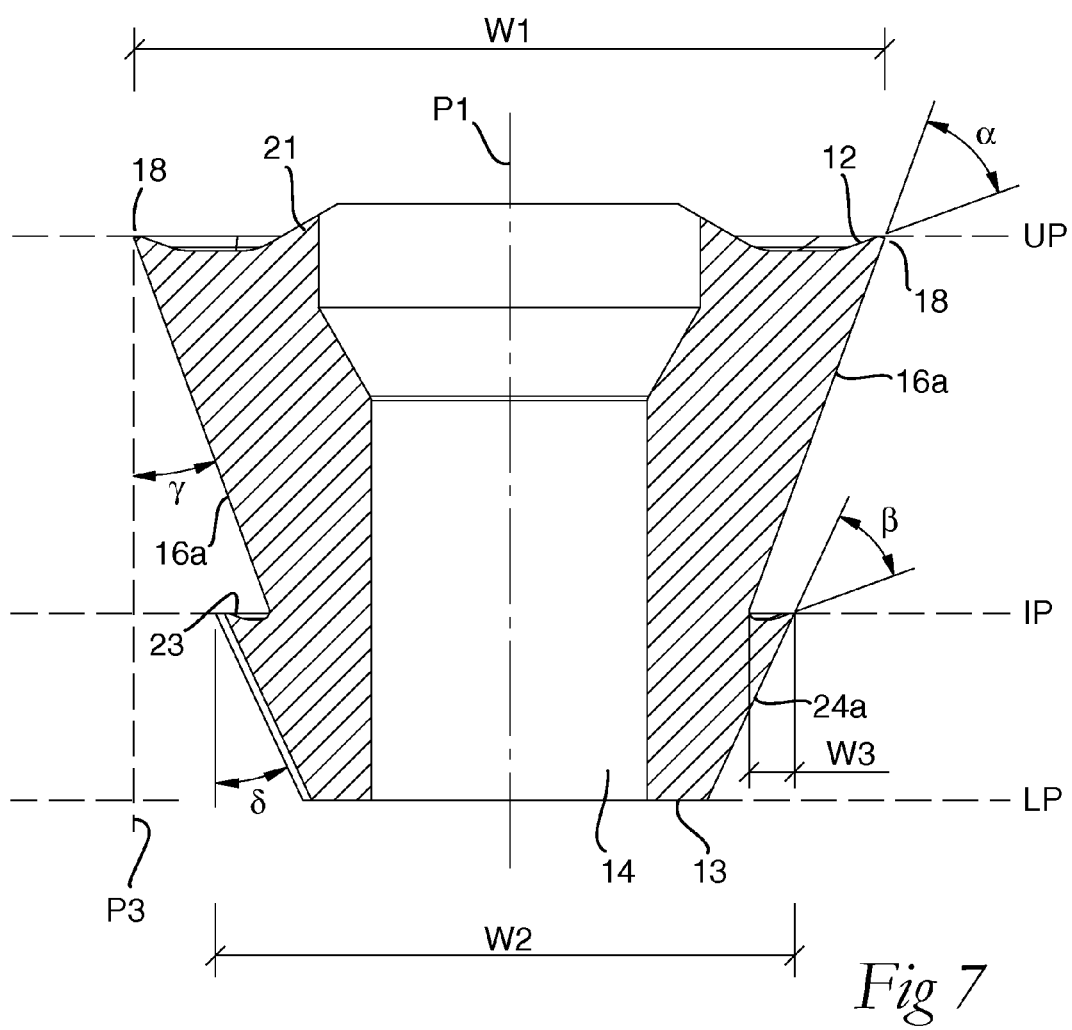
FIG. 7 is an enlarged cross section VII-VII in FIG. 5.

In FIG. 5, P1 designates a vertical plane, which is situated halfway between the two opposite and, in this case, parallel main edges 18 of the milling insert. A center axis C2 is situated in the intersection between the plane P1 and a transverse plane P2, which is situated halfway between the two opposite secondary edges 19. The center axis C2 also constitutes a center axis of the through hole 14. As is seen in FIG. 7, the clearance angle γ between, on one hand, the clearance part surface 16a, and, on the other hand, a plane P3 parallel to the plane P1 amounts to less than about 90°. In other words, not only the cutting edge angle α but also the clearance angle γ is acute. The corresponding clearance angle δ for each secondary clearance part surface 24a is also acute. In the example, γ and δ are differently great (in the drawing γ amounts to about 20° and δ to about 25°). However, this does not prevent them from also being equally great. Like the cutting edges 17, the cutting edges 22 are included in a circumferential and continuous cutting edge formation, which is situated in an intermediate plane IP, which is parallel to the upper plane UP (and in this case also the lower plane LP). In other words, the cutting edges 17, 22 and the chip surfaces 12, 23 positioned inside the same are mutually parallel. In FIG. 7 it is furthermore seen that the spacing or width W1 between the two front main edges 18 is greater than the width W2 between the two trailing, second main edges 25. Analogously, the spacing or length L1 between the opposed wiper edges 19 of the front edge formation (see FIGS. 5 and 6) is greater than the spacing L2 between the wiper edges 26 of the trailing edge formation. Since the insert of FIGS. 1-7 is of an oblong basic shape, L1 is greater than W1 and L2 greater than W2. The secondary chip surfaces 23 have a comparatively small width W3. In the example, W3 amounts to about ⅒ of W2. In practice, W3 may vary, but should at all events amount to at least about 1/20 and at most about ⅕ of W2.

Figure 9:
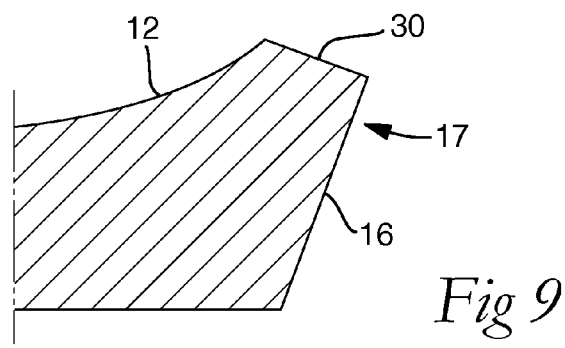
FIG. 9 is an enlarged detailed section showing a first type of cutting edge design.
Figure 10:
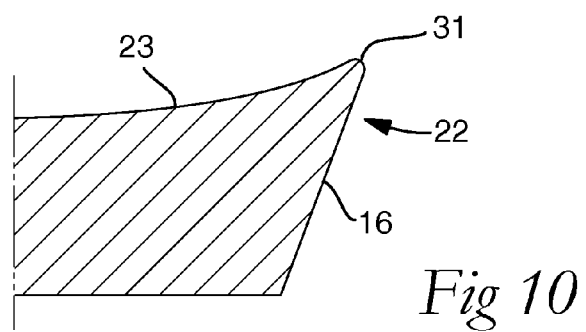
FIG. 10 is a detailed section showing another cutting edge design.

In accordance with a preferred embodiment of the invention, the first and second cutting edges 17, 22 have different strength in the area of the respective cutting edge lines thereof, more precisely so far that the first, front cutting edge 17 is stronger than the trailing cutting edge 22. This is illustrated in FIGS. 9 and 10, FIG. 9 of which shows how a front cutting edge 17 between the chip surface 12 and the clearance surface 16 includes a reinforcement bevel 30, which is lacking in the keener, rear cutting edge 25 shown in FIG. 10. In the last-mentioned case, the cutting edge line has the form of a so-called cutting edge rounding 31 in the transition between the chip surface 12 and the clearance surface 16. In practice, such cutting edge roundings can be provided, for instance, by brushing of a cutting edge being keen in other respects, i.e., a cutting edge where the two surfaces 12, 16 meet each other along a line sharp as a razor.

In FIG. 2, it is seen that a cavity 32 is formed between the bottom surface 9 of the seating 8 and the two side support surfaces 10, 11 in order to accommodate the rear part 28 of the milling insert 2. When the milling insert is mounted in the seating and fixed by means of the tightening screw 15, the underside 13 of the milling insert abuts against the bottom surface 9 of the seating at the same time as the front clearance part surfaces 16a, 16b of the inactive cutting edge are kept pressed against the support surfaces 10, 11. However, the clearance part surfaces 24a, 24b on the bottom part 28 of the milling insert do not contact those surfaces that delimit the cavity 32.

Figure 8:
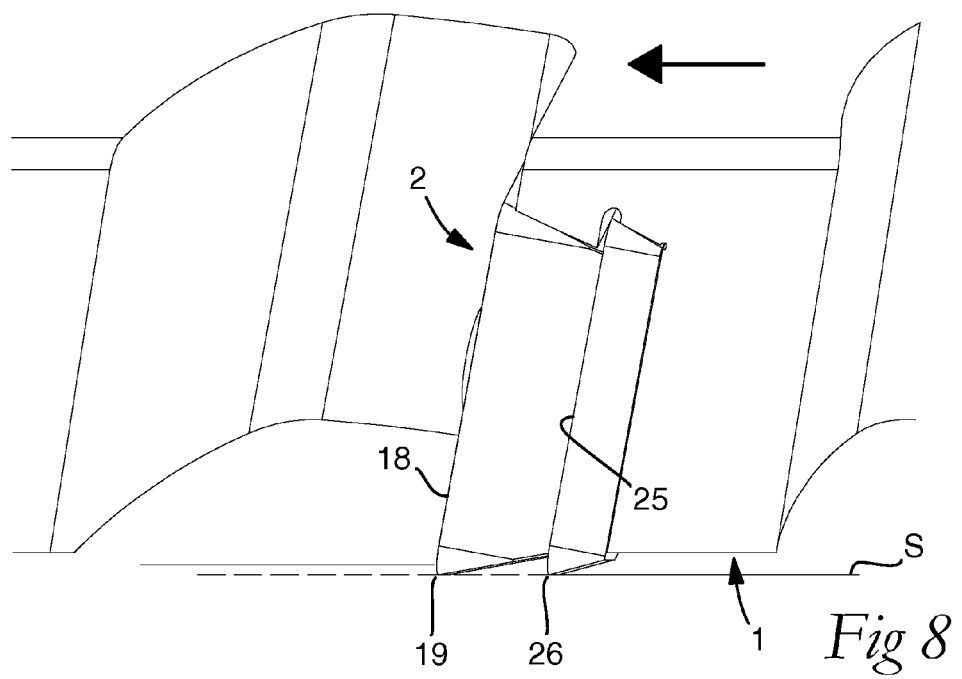
FIG. 8 is an enlarged, partial perspective view showing a milling insert mounted in the periphery of the basic body of the tool.

In FIG. 8, it is schematically shown how the double set of cutting edges of the milling insert can be utilized to improve the surface finish of the generated surface S in a workpiece, more precisely by the front secondary edge 19 being followed by the secondary edge 26. By selecting a suitable positive axial tipping-in of the milling insert in the basic body, the front secondary edge 19 can be brought to provide for a first, comparatively rough surface wiping, after which the trailing secondary edge 26 carries out a concluding, fine wiping, which gives the surface S an utmost good finish. In practice, this effect can be utilized to increase the table feed of the tool while maintaining or improving the surface quality. It is also feasible to utilize the effect only to improve the surface finish, i.e., without increasing the feed.

In an analogous way, the double set of main edges 18, 25 can be utilized to affect the chip cutting process. By suitably determining the radial tipping-in of the milling insert, the front main edge 18 can be brought to remove a chip that is thicker than the chip removed by the trailing main edge 25. In other words, the single chip, which is removed by a conventional milling insert, can be divided into two part chips, which individually have a reduced (e.g., halved) thickness. This effect can, per se, be utilized to increase the feed, and if the same is combined with the surface-improving effect that the two secondary edges provide for, high feed and high surface finish can be obtained in one and the same cutting process.

Another advantage of the invention is that the number of active cutting edges can be doubled or be multiplied without the number of attachments for the milling inserts needing to be increased. If the tool includes ten fundamental milling inserts and ten seatings for the same, the number of cutting edges can be increased to twenty while maintaining ten seatings. In such a way, the number of possible sources of error, which may affect the correct positioning of the milling inserts in the basic body, is not doubled. In comparison with such milling cutters that in one and the same basic body include rough milling inserts as well as fine milling inserts mounted in different seatings, the invention accordingly affords the advantage that the risk of incorrect positioning of the cutting edges in relation to each other is halved.

In the tool shown in FIGS. 1-2, the milling inserts are radially mounted and indexable so far that two sets of cutting edges can be alternately utilized.

Figure 11:
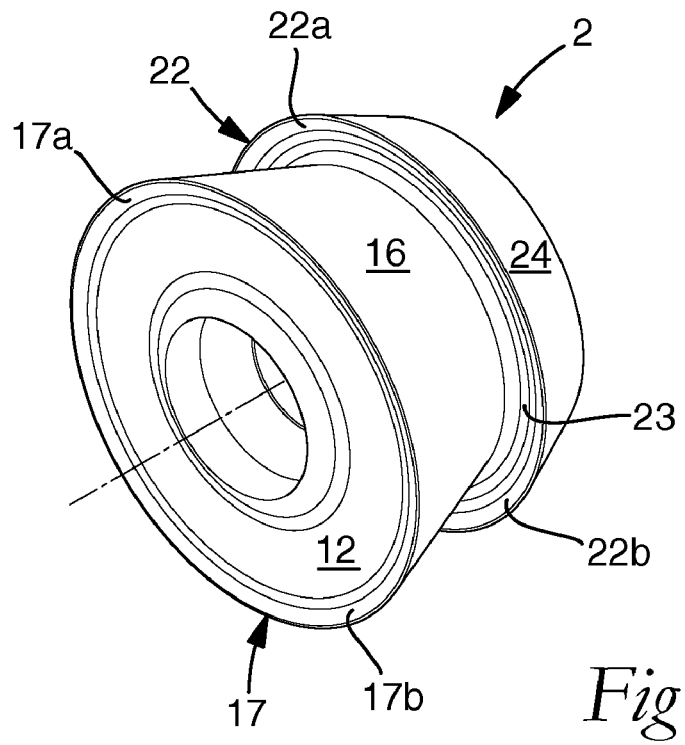
FIG. 11 is a perspective view of an alternative milling insert having a round basic shape.
Figure 12:
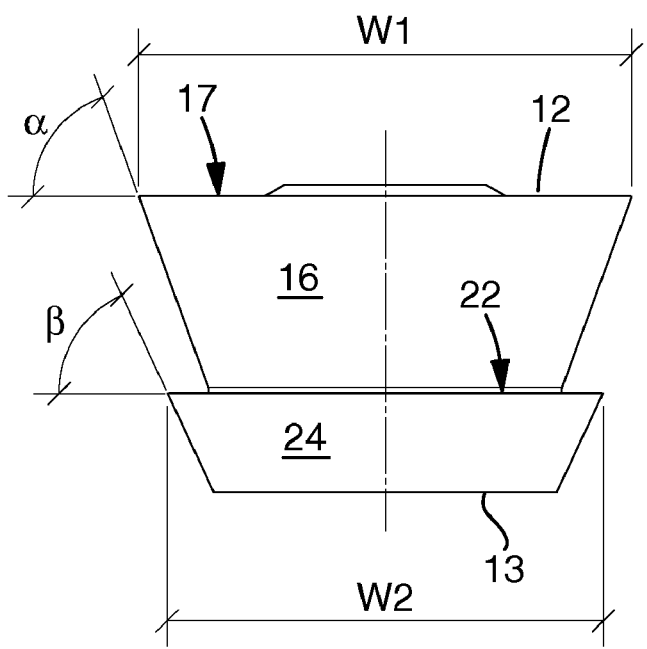
FIG. 12 is a side view of the milling insert according to FIG. 11.

In FIGS. 11 and 12, the invention is shown applied to a milling insert 2 having a round basic shape, the two cutting edges 17, 22 having a circular shape and being endless. The two clearance surfaces 16, 24 behind the respective cutting edge have a rotationally symmetrical shape and are in this case conical, whereby both cutting edges 17, 22 may be designed with a positive cutting geometry. More precisely the conical shape of the clearance surfaces 16, 24 makes it possible to design the cutting edges 17, 22 with acute cutting edge angles α and β respectively. Like conventional round milling inserts, the insert shown in FIGS. 11 and 12 may be indexed, viz. by turning the insert into different positions in the associated seating in the basic body of the tool so as to put different sections of cutting edges in engagement with the workpiece. In FIG. 11 two pair of such sections 17a, 17b and 22a, 22b are exemplified, more precisely in diametrically opposed positions. As seen in FIG. 12 the diameter W1 of the cutting edge 17 (=the spacing between the sections 17a and 17b) is greater than the diameter W2 of the cutting edge 22 (=the spacing between the sections 22a and 22b).

The invention is not limited only to the embodiments described above and shown in the drawings. Thus, the front and rear cutting edges do not need to have one and the same cutting geometry. Furthermore, the axial spacing between the two cutting edges may vary most considerably. In addition, it is feasible to form more than one cutting edge behind the front one. When the milling insert has a polygonal basic shape and each front cutting edge includes a main edge as well as a secondary edge, the trailing second cutting edge may be formed with only one secondary edge, i.e., without a main edge, or alternatively with a main edge but no secondary edge. Also other parameters may vary within the scope of the subsequent claims. Thus, the first and second cutting edges may be equally strong instead of different strengths according to the example. Furthermore, each clearance surface may include two or more part surfaces. In the last-mentioned case, for instance, the front clearance surface of the milling insert does not need to extend unbroken all the way up to the chip surface of the rear cutting edge, but be spaced apart from the same via an intervening part surface having a differing shape. It should also be mentioned that the milling insert may supported with the rear part thereof against side support surfaces in the seating instead of with the front part thereof.

In conclusion, it should also be pointed out that the invention is applicable also to other rotatable cutting tools than milling cutters, e.g., drilling tools.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. An indexable cutting insert for rotatable tools for chip removing machining, comprising:
   an upperside and an underside between which a center axis extends;
   a plurality of alternately useable first cutting edges which are located in an upper plane extending perpendicularly to the center axis and each one of which is formed in a transition between a front chip surface included in the upperside and a first clearance surface extending rearwardly therefrom; and
   second cutting edges located in an intermediate plane and each said second cutting edges formed in a transition between a second chip surface behind a first clearance surface and a trailing second clearance surface;
   wherein a distance between diametrically opposed first cutting edges in the upper plane is greater than a distance between analogous second cutting edges in the intermediate plane, and that a cutting edge angle (α) of at least each first cutting edge is acute.

2. The cutting insert according to claim 1, wherein a cutting edge angle (β) of the second cutting edge is acute.

3. The cutting insert according to claim 1, wherein the cutting insert has a polygonal basic shape and that each first cutting edge includes a chip-removing main edge and a surface-wiping secondary edge, said chip-removing main edge and said surface-wiping secondary edge are disposed at an angle to each other, said main edge connecting to a primary part surface included in the front clearance surface, while the secondary edge connects to a secondary part surface, the second cutting edge including at least one part edge—in the form of a main edge or a secondary edge, or both—which runs along the rear end of the primary clearance surface.

4. The cutting insert according to claim 3, wherein the two second cutting edges are included in a step, which extends endlessly around the cutting insert.

5. The cutting insert according to claim 1, wherein the first and second cutting edges have different strength in the area of the respective cutting edge lines thereof so that the first cutting edge is stronger than the second cutting edge.

6. The cutting insert according to claim 5, wherein the first cutting edge includes a reinforcement bevel, and said second cutting edge not including a reinforcement bevel.

7. The cutting insert according to claim 5, wherein the second cutting edge is sharp so that the cutting edge line thereof only includes a rounding between the chip and clearance surfaces.

8. A rotatable tool for chip removing machining, comprising:
   a basic body, which is rotatable in a predetermined direction around a center axis;
   a replaceable and indexable cutting insert of a material that is harder and more wear-resistant than a material of the basic body, the cutting insert being mounted in a seating in the basic body and comprising an upperside and an underside between which a center axis extends, and a plurality of alternately useable first cutting edges which are located in an upper plane extending perpendicularly to the center axis and each one of which is formed in a transition between a front chip surface included in the upperside and a first clearance surface extending rearwardly therefrom; and
   second cutting edges located in an intermediate plane and each one formed in a transition between a second chip surface behind a first clearance surface and a trailing second clearance surface;
   wherein a distance between diametrically opposed first cutting edges in the upper plane is greater than a distance between analogous second cutting edges in the intermediate plane, and that a cutting edge angle (α) of at least each first cutting edge is acute.

9. The tool according to claim 8, wherein the seating in the basic body comprises a bottom surface against which the underside of the cutting insert is pressed, as well as at least one side support surface against which the first clearance surface of the cutting insert rests, between a side support surface and the bottom surface, a cavity being formed in order to accommodate a rear part of the cutting insert in which the second cutting edge is included.

* * * * *